United States Patent [19]

Sukonick

[11] Patent Number: 4,549,275

[45] Date of Patent: Oct. 22, 1985

[54] GRAPHICS DATA HANDLING SYSTEM FOR CAD WORKSTATION

[75] Inventor: Josef Sukonick, Cupertino, Calif.

[73] Assignee: Cadtrak Corporation, Sunnyvale, Calif.

[21] Appl. No.: 510,343

[22] Filed: Jul. 1, 1983

[51] Int. Cl.[4] .............................................. G06F 3/14

[52] U.S. Cl. .................................... 364/521; 340/725; 340/726; 340/729; 340/792; 364/518

[58] Field of Search ............... 340/725, 726, 729, 792; 364/518, 521

[56] References Cited

U.S. PATENT DOCUMENTS

| | | | |
|---|---|---|---|
| Re. 31,200 | 4/1983 | Sukonick et al. | 340/726 X |
| 4,070,710 | 1/1978 | Sukonick et al. | 364/900 |
| 4,197,590 | 4/1980 | Sukonick et al. | 364/900 |
| 4,360,876 | 11/1982 | Girault et al. | 364/521 X |
| 4,366,475 | 12/1982 | Kishi et al. | 364/521 X |
| 4,400,727 | 8/1983 | Aron | 358/103 |
| 4,442,495 | 4/1984 | Sukonick | 340/726 X |
| 4,458,330 | 7/1984 | Imsand et al. | 364/521 X |
| 4,475,104 | 10/1984 | Shen | 340/729 |

*Primary Examiner*—Errol A. Krass
*Assistant Examiner*—Edward R. Cosimano
*Attorney, Agent, or Firm*—Spensley Horn Jubas & Lubitz

[57] ABSTRACT

In this graphics data handling system a CAD workstation cooperates with the host computer which stores a site list representation of a complex three dimensional structure. Backdrop viewfile representation of the structure, advantageously with hidden surfaces removed, are established in vector format by data transformation from the site list. Bit map raster views are derived from the backdrop viewfiles, and are stored in a pixel memory. Video screen images of selected views of the structure are derived by readout of the raster view data from the pixel memory.

During panning of the video screen display, when the image nears the edge of a raster view, a strip of data in that raster view, in the region opposite the direction of panning travel, is deleted. This is replaced by new data from a strip of the backdrop viewfile representing the portion of the structure immediately contiguous to the existant raster view in the direction of panning travel. With this arrangement, toroidal panning is implemented that permits the user to pan across a view of the structure which is far larger than encompassed by an individual raster view.

9 Claims, 5 Drawing Figures

GRAPHICS DATA HANDLING SYSTEM FOR CAD WORKSTATION

BACKGROUND OF THE INVENTION

1. Field of the Invention

The present invention relates to a graphics data handling system for a computer aided design (CAD) workstation. The system maximizes rapid accessibility to arbitrarily selectable two dimensional views of a complex site stored in three dimensional representation by a host computer.

2. Description of the Prior Art

In many computer-aided design applications, a host computer establishes and stores a three dimensional representation of the item being designed. For example, in the design of a chemical process plant, the host computer may assemble a site representation of the plant which consists of a list of the thousands of pipes, valves, fittings and equipment interconnections that comprise the plant. The site list may include a geometric description of each such component, together with the three dimensional coordinates which spatially locate each component within the plant site.

Advantageously, each engineer working on the plant design will have a workstation or graphics display system that interfaces with the host computer and facilitates the display of selected images of the plant being designed. Such a workstation would permit the engineer to rapidly display two dimensional views, from arbitrary viewpoints, of arbitarily selectable portions of the plant represented by the site lists in the host computer. One objective of the present invention is to provide a graphics data handling system to facilitate such rapid selectable viewpoint image display in a CAD workstation.

A particularly useful workstation configuration is disclosed in the inventor's copending U.S. patent application entitled "Graphics Display System With Viewports Of Arbitary Location And Content", which was filed on Nov. 2, 1982 as Ser. No. 438,476. That patent application, which is assigned to Cadtrak Corporation, the assignee of the present application, is incorporated herein by reference.

In a workstation incorporating the graphics display system of patent application No. 438,476 individual viewports or video images of arbitary arrangement, number, size and content may be produced on the video screen. Thus e.g., the designer may arbitrarily select which views of the plant are to be displayed. For example, he could simultaneously display a plan or elevation view of a major portion of the plant, together with an enlarged perspective view of the immediate portion of the plant piping which is undergoing design. He can use a panning capability to move the displayed viewport image across nearby or distant portions of the plant, and can zoom in to obtain enlarged views of plant details.

There are certain constraints that limit the display flexibility of such a system when utilized with a host computer that maintains what may be a massive site list. For example, if a two dimensional plan or elevation view of a certain portion of the plant is desired, relatively time consuming algorithms must be used to convert the three dimensional site list information into a two dimensional representation that is capable of being displayed on a video screen. The processing includes culling from the site list the descriptors of all of the plant components which would appear in the desired two dimensional view, and converting the geometrical descriptors of these components and their three dimensional spatial location information (as contained in the site list) into appropriate two dimensional vector or raster representations. Additional processing is required to remove "hidden lines and surfaces" from the resultant two dimensional transformation (i.e., to remove from the final display the portions of components which, though present in the plant at the displayed area, would be hidden from view by other components present in the two dimensional display). Substantial computer processing time, typically hours, is required to perform such 3D-to-2D conversion and hidden line removal. If the designer should then wish to view a different portion of the plant, even one relatively close to, but not contained within, the previously transformed region, another time consuming transformation and hidden line removal computation must be carried out. Minutes or hours may pass before the new image is available to the designer.

Another object of the present invention is to provide a graphics data handling system which maximizes the amount of two dimensional graphics data available to the designer, without requiring additional time consuming 3D-to-2D transformations to be performed. To this end, another objective is to provide a system in which backdrop viewfiles are established in advance, which comprise two dimensional vector representations of substantial subportions of the site represented in the host computer. The video images are derived from these backdrop viewfiles, which are maintained at the workstation. The designer can rapidly access the design information from these backdrop viewfiles for display with panning and zoom. By precomputing backdrop viewfiles for each of the plant subsystems on which the designer is working, the designer will have instantly available to him views of all of the local and surrounding areas of the plant which he is likely to use during a design session. There is no computation delay involved with panning within this region.

A further object of the present invention is to provide a graphics data handling organization that readily facilitates the generation and storage of backdrop viewfiles and the arbitary selection and display of viewport images of portions of the data contained within such viewfiles, with arbitary panning and zoom capability. To this end, it is an object of the present invention to provide an organization in which graphics data is handled in a set of different coordinate systems that (a) maximize the arbitary availability of such data for video display, while (b) minimizing the requirements of data storage and complex computation of image transformation.

SUMMARY OF THE INVENTION

These and other objectives are achieved by providing a graphics data handling system in which desired viewport images are derived from backdrop viewfiles that store two dimensional graphics data in vector format. These backdrop viewfiles, maintained in a "universal coordinate system" UCS, are derived in advance from three dimensional site information stored in the host computer in a "world coordinate system" WCS.

Using the appropriate input device, the operator can specify regions of the graphics data that he wishes to display. An appropriate pixel data storage controller converts the requisite data from the UCS format in the backdrop viewfiles into a desired raster view in a pixel memory. This view is in a "raster coordinate system" RCS.

The user can then specify the desired portions of these raster views that he wishes to display on the video screen. Viewport images are then generated in a "toroidal coordinate system" TCS from the raster views. These are displayed on the video screen at arbitary locations selected by the user and represented in a "window coordinate system" WiCS.

By using a track ball, cursor or like input device, the operator can pan any viewport image across the data contained not only in the corresponding raster view, but across the larger graphics image area represented in the backdrop viewfiles. As soon as a viewport image is panned near an edge of the corresponding raster view, additional graphics data is transformed from the backdrop viewfile into the raster memory in "toroidal" strip writing fashion. Panning can continue across this new graphics data without interruption. The fact that the graphics data in the raster view is changing in a toroidal fashion, and the fact that this data is being accessed toroidally for generation of the viewport image, is not apparent to the user, who sees only a smoothly panning image.

The operator may also control the zoom magnification of each viewport image. The inventive graphics data handling system incorporates a capability that both permits each raster view to be produced with a selectable magnification factor with respect to the data in the backdrop viewfile, and which independently permits the viewport image to be magnified with respect to the raster view from which it is derived.

The usefulness of the invention is best understood when the time taken to achieve the above transformations is understood. For a process plant with 2500 piping components (valves, tees, elbows, etc.) the production of each backdrop viewfile from the three dimensional site information takes approximately one hour using conventional hidden line removal algorithms on a typical medium size computer. Production of a typical raster coordinate system view from a backdrop viewfile typically takes one to five seconds using an implementation of the present invention using a 16-bit microprocessor. With such a workstation, transforming a view from the raster coordinate system to the video screen takes place in 1/60 of a second. An arbitrarily large number of raster coordinate system views (of differing viewpoint or difering scale factor) can be stored simultaneously in the raster memory, limited only by the size of raster memory provided. Smooth panning (60 screen updates per second) may take place at up to 3 inches per second.

BRIEF DESCRIPTION OF THE DRAWINGS

A detailed description of the invention will be made with reference to the accompanying drawings wherein like numerals designate corresponding elements in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

Figure 1A:
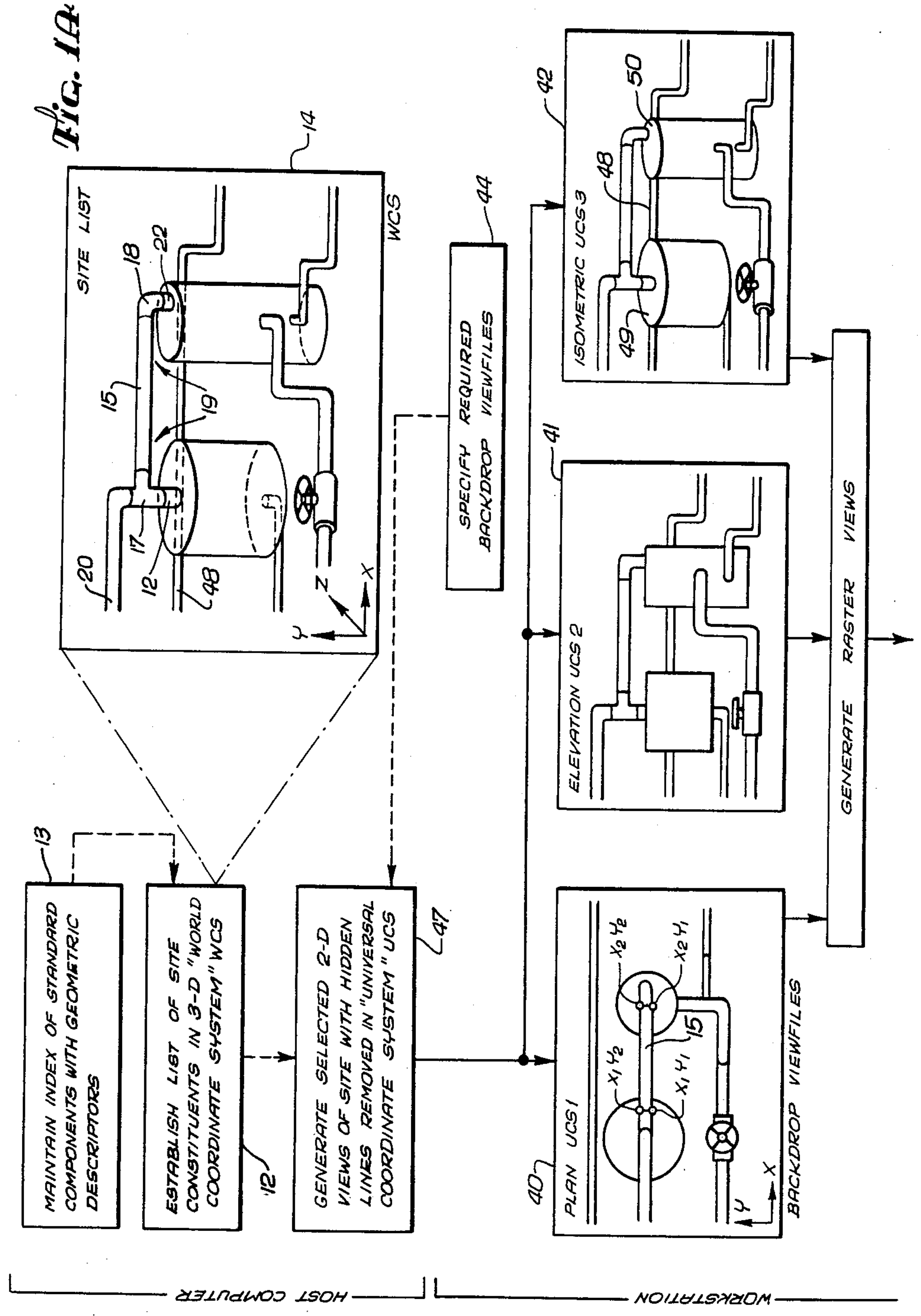
FIGS. 1A and 1B comprise a pictorial representation of the various graphics data formats in a host computer and a CAD workstation utilizing the inventive graphics data handling system.
Figure 1B:
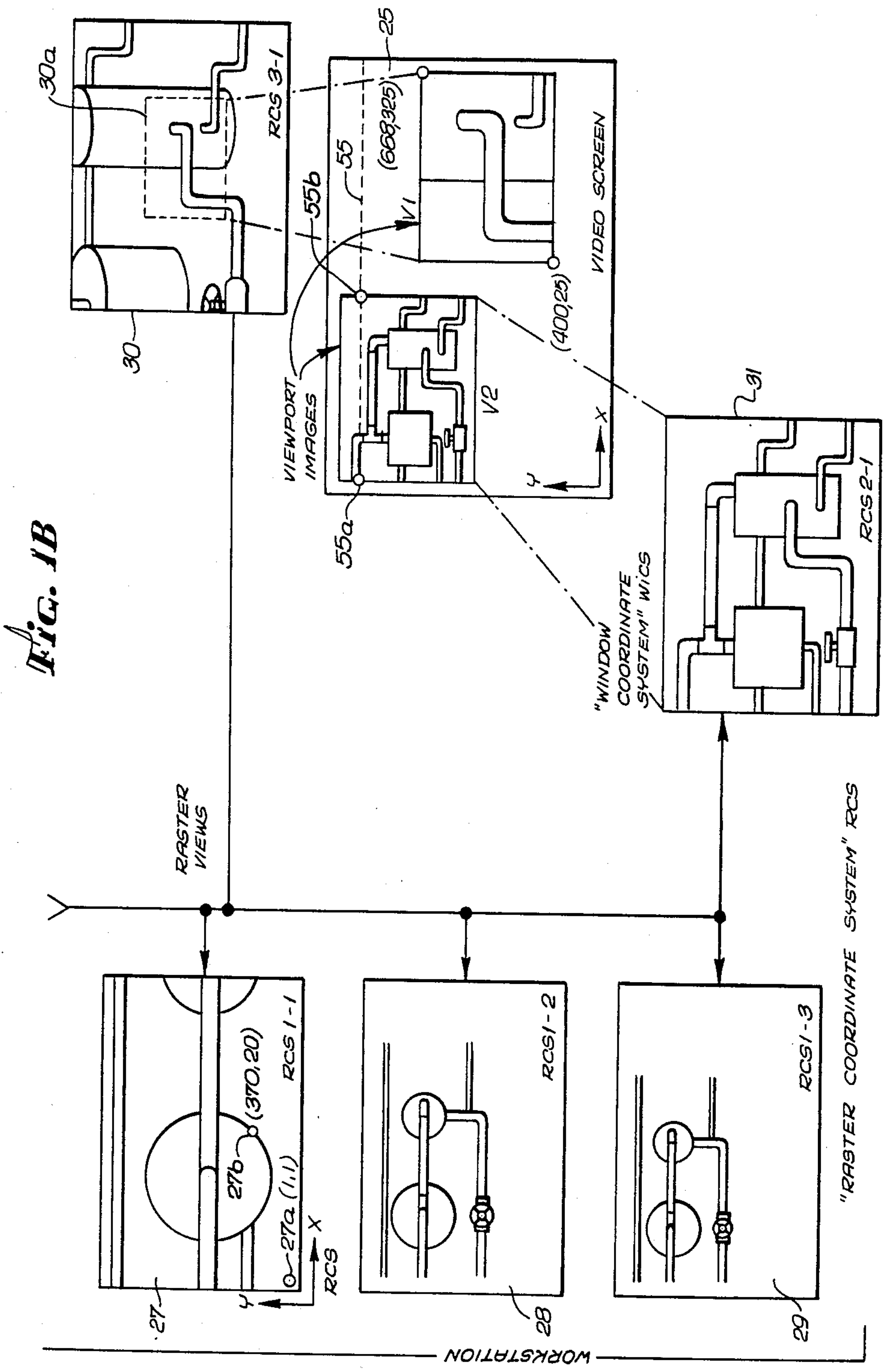
Figure 2:
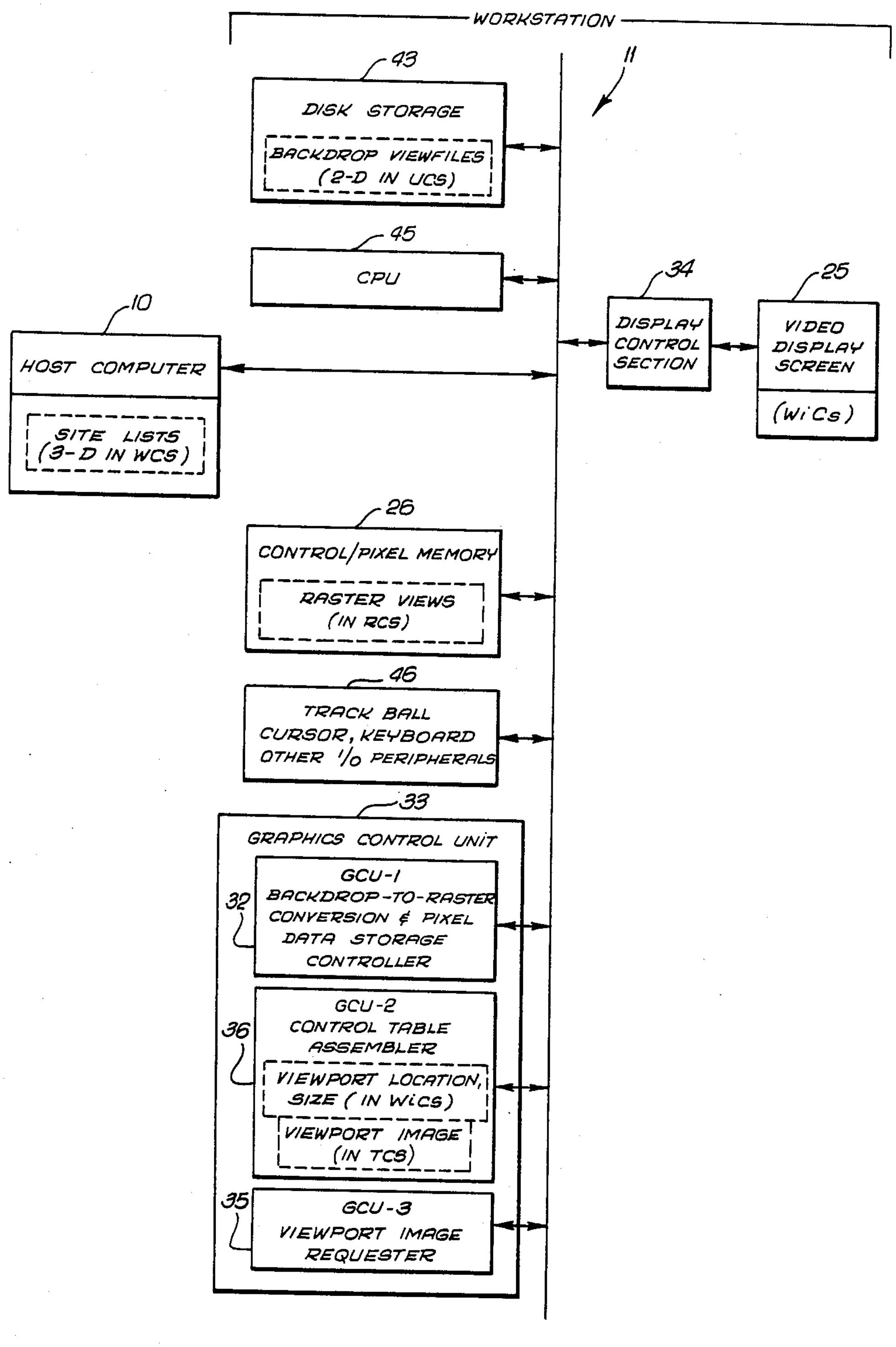
FIG. 2 is a block diagram of a CAD workstation utilizing the graphics data handling system of the present invention.

FIGS. 1A and 1B illustrate the various data formats utilized by a host computer 10 and a CAD workstation 11 (FIG. 2) employing the inventive graphics data handling system. It should be understood that the computing functions of the host computer 10 may well be performed on the workstation CPU (block 45, FIG. 2) as it would also be a general purpose computer. By way of example only, these figures depict a CAD application involving the design of a chemical process plant, however the invention is not so limited.

As the chemical process plant is developed, the host computer 10 establishes (block 12, FIG. 1A) a "site list" of all of the constituent elements in the plant. This list is established in conjunction with an index (block 13) of standard components that is also maintained by the computer 10. For example, this component list may include the name of a component (e.g., pipe section, elbow, tee, nipple, valve) together with a set of geometric descriptors for that component.

The geometric descriptors of a pipe section may comprise a pair of concentric cylinders representing respectively the inside and outside surfaces of the pipe section. The component index may indicate that there are three dimensional descriptors associated with the pipe section, namely, the inside diameter, the outside diameter (or alternatively, the wall thickness) and the length. The index may also specify a material type, manufacturer and other data.

The site list may comprise an ordered table of all of the components included within the chemical plant, together with the coordinates locating each such component within the site. Herein, this is called the "world coordinate system" WCS, and is used to specify each component location in three dimensional space.

The inset view 14 of FIG. 1A is a pictorial representation of part of a chemical process plant that might be represented by the site list in the computer 10. (No such visual image is present in the host computer, and the view 14 is provided only to aid in explanation of the present invention.) For each component of the plant there will be a corresponding entry in the site list. For example, for the pipe section 15, the list entry might specify "pipe section" (with reference being made to the index of standard components to obtain the geometric descriptors thereof), of length 10 feet, inside diameter 1 inch and outside diameter 1.5 inches. The site list will specify the location of the pipe section 15 with respect to the X, Y and Z coordinates of the WCS. For example, the center of the pipe section 15 may be situated at a position x=25 feet, y=30 feet, 3 inches and z=12 feet, 2 inches with the pipe axis parallel to the WCS x-axis. The site list may also indicate that one end of the pipe section 15 is connected to a tee (the tee 17 in view 14) and that the other end is connected to an elbow 18.

Different organizations may be used for the site list. For example, instead of listing each plant component separately, these may be arranged in groups. Thus the site list may specify as a single "pipe" a set of components that are directly interconnected. For example, in the view 14, a "pipe" 19 may be defined as having several pipe sections 15, 20, 21, 22 connected in a certain order with a tee 17 and an elbow 18. Such an ordering of "pipe" and "components" may simplify the handling of data in the site list.

Regardless of particular arrangement, however, the site list is characterized with respect to the present system as specifying the three dimensional location of each plant component in terms of the world coordinate system, i.e., a coordinate system that established the relative position of each plant component with respect to each other in the actual plant as it will finally be constructed (or in a scaled version thereof).

At the other end of the computer aided design system is a video display screen 25 which is part of the workstation 11. On the screen the designer wishes to display certain "viewport images" $V_1$, $V_2$ (FIG. 1B) that are two dimensional views of portions of the plant being designed. The workstation 11 utilizes the inventive graphics data handling system to optimize the conversion of data contained in the site list into a format for display on the screen 25 with maximum accessibility and selectability.

To this end, the workstation 11 generally employs a raster scan display technique set forth in the inventor's U.S. Pat. No. 4,197,590 entitled "Method For Dynamically Viewing Image Elements Stored In A Random Access Memory Array" and U.S. Pat. No. Re. 31,200 entitled "Raster Scan Display Apparatus For Dynamically Viewing Image Elements Stored In A Random Access Memory Array".

In this regard, the workstation 11 includes a control pixel memory 26 which stores raster views of selected portions of the plant represented by the site list in the computer 10. In each raster view, the graphic image is stored in the form of picture element ("pixels") each of which may represent a single dot on a video screen display (at 1:1 magnification) of that raster view.

Each pixel is represented by a set of bits in the pixel memory. If a only a black and white display is required, each pixel may be represented by a single bit, which may be "1" for black and "0" for white. Alternatively, each pixel may be represented by set of plural bits which may define a gray scale, a color, or an address to a color map which in turn defines the color of the corresponding picture element.

The sets of pixel bits which make up a complete raster view may be stored at contiguous or non-contiguous locations in the pixel memory. For example, the sets of bits representing the pixels in a complete horizonal line of the raster view may be stored in contiguous locations of the pixel memory. Similar sets of pixel data for consecutive lines in the raster view likewise may be stored in consecutive groups of locations of the pixel memory.

In accordance with the teachings of the above-identified U.S. Pat. Nos. 4,197,590 and Re. 31,200 the data in the pixel memory is accessed in real time, in synchronism with the horizontal and vertical scanning of the video display screen 25, and used to control the color and intensity modulation of the CRT. In this manner, the pixel data is converted to an actual image on the video screen 25.

Each raster view is a representation of a two dimensional view of a portion of the plant represented by the site list in the host computer 10. Five such raster views 27 through 31 are shown in FIG. 1B. Although illustrated pictorially in FIG. 1B, in fact each such raster view consists of a set of digital data stored in the pixel memory 26 and representing (in the manner just described) the individual picture elements which comprise the respective views. Within each such raster view, each pixel may be identified by a corresponding position in the two dimensional "raster coordinate system" RCS. For example, the pixel 27a at the lower left corner of the raster view 27 has the coordinates $x=1$, $y=1$ in the RCS wherein the x-axis is measured by pixel positions across each horizonal line, and the y-axis is measured by lines going from the bottom to the top of the raster view.

By way of example, the pixel 27b in the raster view 27 is located at $x=370$, $y=20$ in the RCS. This pixel is actually represented by a set of one or more bits which define an intensity or color of the corresponding pixel, and which are stored at certain memory locations in the pixel memory 26 that correspond to the RCS location (370, 20). The actual mapping or table which lists the correspondence between each pixel position in a raster view and the corresponding actual memory address or addresses in the pixel memory 26 is established and maintained by a controller 32 which is part of a graphics control unit 33 in the workstation 11.

Under operator control, any of the raster views stored in the pixel memory 26 may be displayed at arbitary positions and magnifications on the video screen 25 within 1/60th of a second. In the example of FIG. 1B, the raster view 31 is displayed at 1:1 magnification as the viewport image $V_2$, while a portion 30a of the raster view 30 is displayed in magnified form as the viewport image $V_1$. Such seective readout and display of the stored raster views advantageously is accomplished by the workstation 11 in accordance with the teachings of the inventor's above-identified co-pending patent application, Ser. No. 438,476 entitled "Graphics Display System With Viewports Of Arbitary Location". The display control section 34 of the workstation 11 cooperates with a viewport image requester 35 and a control table assembler 36 to read out and display the desired information from the pixel memory 26.

The desired location and size of each viewport image on the video screen 25 is specified in a "window coordinate system" WiCS that is defined in terms of pixel locations on the actual video screen. Thus the WiCS is a two dimensional coordinate system in which the x-axis is measured in terms of pixel locations across a line of the CRT screen, and in which the y-axis is measured in terms of lines on the video screen going from bottom to top. By way of example, the origin (bottom left corner of the viewport $V_1$ in FIG. 1B is located at coordinates (400, 25) in the WiCS while the upper right corner is located at coordinates (668, 325).

While the selection and display of the various raster views may be accomplished readily and quickly, establishing the raster views from the data contained in the site list of the host computer would be very time consuming if done directly. Thus if the designer needs to display a portion of the plant which is not contained within a present raster view, even though the desired plant elements may be contiguous to those shown in the present raster views, a great deal of computation time would be required to generate the new raster view directly from the site list. This clearly is an undesirable condition.

To alleviate this problem, the graphics data handling system of the present invention utilizes an intermediate set of "backdrop viewfiles" 40 through 42 (FIG. 1A) which advantageously are resident in disc storage 43 in the workstation 11.

Each backdrop viewfile comprises a vector representation of a selected two dimensional view of a portion of the plant that is being designed. Typically, the represented portion of the plant is in the area that the designer is currently working, and is larger in extent that the region which would be selected by the designer for display as a viewport image. As discussed in more detail below, the raster views 27 through 31 are derived from these backdrop viewfiles 40–42.

The desired backdrop viewfiles are specified (block 44, FIG. 1A) to the host computer 10 by a central processing unit (CPU) 45 in the workstation 11 in response to a user input designating the region of the plant which he desires to display. For example, the user may utilize a keyboard or other input peripheral 46 to specify that he will need plan, elevation and isometric views of a particular region of the plant being designed.

From this information, the CPU 45 will establish a view definition matrix or assemblage of data which specifies to the host computer the type of backdrop viewfiles which are required, and the region of the plant which is to be encompassed therein.

As an example, the user may specify that he is interested in the region of the plant bounded by certain coordinates in the WCS. For example, he may be interested in viewing components of the plant which are physically situated in the cube that is bound by the origin (0, 0, 0) of the WCS at the left bottom front corner and the coordinates $x=25$ feet, $y=25$ feet, $z=25$ feet at the upper right rear corner.

The user will also specify the desired views. For example, these may include a plan view through a certain defined horizontal plane in the world coordinate system (e.g., a top view through the plane $x=25$ feet), an elevation view through a defined vertical plane, and an isometric view from a defined viewpoint. Such view planes and isometric viewpoints are specified in the world coordinate system.

From this view definition matrix information, the host computer generates (block 47, FIG. 1A) the desired backdrop viewfiles from the information contained in the site list. Each such viewfile consists of an ordered list of vectors which define a two dimensional image of the specified portion of the plant as viewed in the manner defined for the particular viewfile. For example, the backdrop viewfile 40 illustrated in FIG. 1A represents a top plan view of the designated portion of the plant (i.e., as viewed from the top at the plane $Y=25$ feet). The illustrated backdrop viewfiles 41 and 42 represent elevation and isometric views of the same portion of the plant, respectively along the plane and from the viewpoint specified in the view definition matrix.

The number of backdrop viewfiles is arbitary, as is the selection of views therein. Thus more or less than three viewfiles may be utilized by the workstation 11. Furthermore, although the three viewfiles 40–42 illustrated in FIG. 1A are of the same region of the plant, this is not necessary. Indeed, more often backdrop viewfiles of different regions of the plant may be preestablished and maintained in the disc storage 43.

Although each of the backdrop viewfiles 40–42 is illustrated pictorially in FIG. 1A, in actuality the viewfiles are not themselves in pictorial format. Rather, they are in the form of digital data representing vectors that in turn represent image lines in the selected plan, elevation or isometric view. The vectors are defined in a two dimensional "universal coordinate system" UCS. For each such backdrop viewfile, this coordinate system may have its origin e.g., at the lower left corner of the two dimensional image represented by the vectors comprising an individual backdrop viewfile.

For example, the backdrop viewfile 40 may comprise a list of vectors specified with respect to a UCS origin at the lower left corner of the represented top plan view. In the backdrop viewfile 40, the pipe section 15 may be defined by four vectors representing straight lines connecting the points having designated UCS coordinates $(x_1, y_1)$, $(x_2, y_1)$, $(x_2, y_2)$ and $(x_1, y_2)$. The definition of the backdrop viewfile 40 as a list of vectors is convenient for illustration. In fact other forms, such as filled polygon patches for showing shaded raster images, may be used instead. The important point is that the backdrop file has a form that can be transformed into pixels in the raster coordinate system at high speed.

The vector listing which comprises each backdrop viewfile in the UCS is generated by the host computer. This computation may take a very long time, typically many minutes or even many hours, depending on the complexity of the plant region that is represented by the desired backdrop viewfile. As part of the viewfile generation, the host computer advantageously will remove hidden lines from each view. Thus in the elevation and isometric backdrop viewfiles 41 and 42, the portions of the pipe branch 48 which lie behind the tanks 49 and 50 are hidden from view. In these viewfiles the pipe branch 48 respectively may be represented by three separate sets of vectors that define only the portions of the pipe branch 48 which would be seen in a corresponding elevation or isometric image.

The 3D-to-2D transformation algorithms with hidden line removal utilized by the host computer 10 may be conventional. The computation of such transformation typically is very time consuming. What is not conventional in the present invention is the use of backdrop viewfiles (in a two dimensional, vector format) as an intermediate step to the generation of the raster views from which the video displays are generated. This is a significant feature of the present invention, in that the production of such raster views can be accomplished very quickly (typically in seconds) so that the selection of new views for display on the video screen does not necessitate long delays (as was required in the prior art) while the host computer generated the requisite raster views directly from the site list or other primary data. In the case of toroidal panning, continuous smooth pan can be readily accomplished as described in patent application Ser. No. 438,476.

Generation of the raster views is carried out by a backdrop-to-raster conversion and pixel data storage controller 32 which is part of the graphics control unit 33 in the workstation 11. Initially, the operator can select (using keyboard or graphical input) a set of raster views to be generated and stored in the pixel memory 26. Generally, each raster view is derived from a corresponding one of the backdrop viewfiles, and comprises a raster or pixel representation thereof. For example, the raster view 31 (FIG. 1B) is a pixel representation of the entire elevation view that is represented in vector format by the backdrop viewfile 41. The designation RCS2-1 indicates that this is the first raster view generated from the elevation UCS2 of FIG. 1A. This raster view RCS2-1 is, for example, approximately 320 pixels across as contrasted with the backdrop viewfile UCS2 which may be 64,000 dimensional units (in UCS) across, meaning that the transformation from vector to raster format (and from UCS to RCS coordinate systems) has been made with, magnification or scale factor of 1/200. The raster view 31 contains all of the pictorial information contained in the backdrop viewfile 41.

The raster view 30 of FIG. 1B is derived from the isometric backdrop viewfile 42. In this raster view, only a portion of the image represented by the backdrop viewfile 42 has been converted to pixel format, with a scale or magnification factor Sfac of approximately 1/125 (i.e., Sfac=1/125). The raster views 27–29 each have been derived from the backdrop viewfile 40, with different scale factors.

Transformation from the vector format of the backdrop viewfile to the pixel format of the raster views is relatively straightforward. For example, it may simply comprise accessing each linedefining set of vectors from the backdrop viewfile, and writing in a "1" to each pixel memory position corresponding to the loci of the line defined by that set of vectors. Since the universal coordinate system UCS and the raster coordinate system RCS are two dimensional, the transformation requires in general one addition (offset) and one multiplication (scaling) per axis, and can be performed very quickly by the CPU 45. Since hidden lines already have been removed in the backdrop viewfiles, no complex algorithms must be carried out by the CPU 45 to eliminate hidden lines from the raster views. This time consuming work already has been done in advance in association with the 3D-to-2D transformation carried out by the host computer when the backdrop viewfile was created.

As described hereinabove, the actual viewport images which are displayed on the video screen 25 are obtained by raster readout of all or selected portions of the raster views stored in the pixel memory 26. The manner in which this is accomplished by the display control section 34 in cooperation with the graphics control unit 33 is set forth in the inventor's above-identified copending U.S. patent application Ser. No. 438,476. Generally, the operator first defines the size and location of the desired viewports $V_1$, $V_2$ in the window coordinate system. The operator next specifies what images are to be displayed in each of these viewports. Such images may be defined by indicating: (a) the specific raster view that is to be reproduced, (b) the viewport in which the view is to appear, (c) the magnification or pixel replication zoom scale factor to be used, and (d) if less than the entire raster view is to reproduced, the location within the raster view of the bottom left corner of the portion of the view that is to be displayed.

From the foregoing information, the control table assembler 36 in the graphics control unit 33 assembles a list of control words, the details of which are specified in the above-identified copending application, Ser. No. 438,476. In general, the control table includes a set of control word sequences that specify the locations within the pixel memory 26 that contains the raster view pixel data which is to be accessed sequentially to provide the video modulation information for each scanned row of the video screen CRT. The display control section 34 utilizes portions of the control word information and accessed pixel data to produce the appropriate drive signal for the video screen. For example, when scanning the video line 55 (FIG. 1B), viewport information earlier provided to the display control section 34 in the window coordinate system defines the left and right end locations **55*a*, 55*b* of the viewport $V_2$, and specifies that the remainder of the video scan line 55 should be of the interviewport color, since it intersects no other viewport. The display control section 34 uses this information to gate pixel data to the video screen during the time that the CRT beam is traversing the scan line region between the viewport left edge 55*a* and right edge 55*b***.

In the illustration of FIG. 1B, the image in the viewport $V_2$ is a 1-to-1 reproduction of the raster view 31 which itself is a 1:200 representation of the backdrop viewfile 41. Upon operator specification (e.g., via a keyboard or other peripheral 46) to the graphics control unit 33 of the desired viewport image, the controller 32 accesses the requisite backdrop viewfile from disc storage 43 and performs the necessary vector to raster transformation. In the case of the image requested for the viewport $V_2$, the controller 31 would access the backdrop viewfile 41, perform a vector to raster transformation at a 1/200 scale factor, and place the resultant raster view 31 into the pixel memory 26. A table entry would be made specifying the particular pixel memory locations that contain the data representing the raster view 31.

Thereafter the control table assembler 36 will create an appropriate set of control word sequences which specify that the pixel data required to produce the desired image in the viewport $V_2$ should be read from those certain pixel memory 26 locations that contain the raster view 31. The particular memory locations in the pixel memory 26 that are referenced by the control word sequences created by the assembler 36 may be considered as being in the "toroidal coordinate system" TCS, which is further described below.

When the operator specifies a viewport image that is to be magnified with respect to the backdrop viewfile from which it is derived, or which represents only a portion of the information available within a backdrop viewfile, the controller 32 will perform a vector to raster transformation, optionally with scale magnification, on only a portion of the information contained in the requisite viewfile.

This is illustrated by the image in the viewport $V_1$. The operator may initially specify only the particular region, magnification and type of view that is desired within the viewport $V_1$. For example, he might specify that this is to be an isometric view (from the viewpoint at which the isometric background viewfile 42 was developed), with a certain displayed scale (e.g., one inch on the video screen 25 representing two inches in the actual plant, in WCS). The operator would also specify that the bottom left corner of the displayed image should start at a certain location in the plant (as specified in WCS).

Using this information, the graphics control unit 33 will recognize that an appropriate raster view must be generated from the isometric backdrop viewfile 42. This raster view must include at least the region of the plant which has been requested for display by the operator. The controller 32 could then direct the production of a raster view containing only pixel information corresponding to that requested for immediate display in the viewport $V_1$. However, since the workstation 11 contains provision for panning, it is more desirable in such instance to have the controller 32 create a raster view that contains both the image information that the operator immediately desires to see, together with image information of the surrounding area of the plant. Accordingly, the controller 32 advantageously will create a raster view 30 (FIG. 1B) which includes not only the area 30*a* requested for display, but also contains surrounding plant information.

From the spatial extent (e.g., in WCS) of the plant region that is requested for display, the controller 32 can determine whether or not all or only a portion of the requisite backdrop viewfile need be converted into the corresponding raster view. In the example just described, only a very small portion of the plant has been requested for display. Therefore the raster view 30 is of lesser extent than the isometric background viewfile 42 from which it is derived. To ensure that the converted view region is of adequate definition, and or to ensure that the converted raster view fills a sufficient portion of the pixel memory 26, a scale factor 1/125 is employed in the transformation.

This backdrop viewfile to raster view transformation scale factor need not be sufficiently great so that the resultant portion of the raster view (herein 30*a*) that is desired for ultimate display is "full size" with respect to the viewport on the video screen 25. The operator can further specify an integer display magnification factor Rfac which will be employed by the display control section 34 in creating the image within the viewport $V_1$ from the pixel data contained in the portion of the pixel memory 26 corresponding to the region 30*a* of the raster view 30. This zoom factor Rfac is a pixel replication value which specifies the number of screen pixels on the CRT 25 that are to correspond with a single pixel as represented in the memory 26. For example, if a pixel replication factor of two is specified, each pixel in the memory 26 will be represented by two screen pixels in each row, and the information in each row will be duplicated in the next row.

Figure 4:
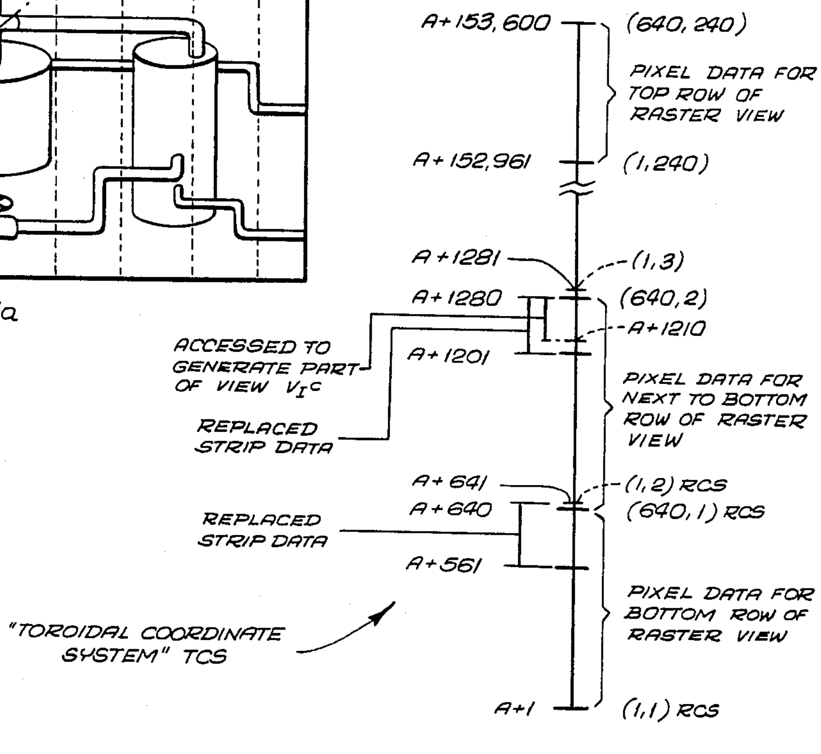
FIG. 4 illustrates the memory assignment of raster view data in the pixel memory of the CAD workstation of FIG. 2.

To facilitate an understanding of how toroidal panning is implemented, FIG. 4 shows an illustrative arrangement of pixel data for the raster view 30 within the pixel memory 26. The raster view herein has 640 pixel locations in each horizonal row, and has 240 such rows, for a total of 153,600 pixel locations. Using the raster coordinate system described above with the x-axis corresponding to the pixel position in a horizontal row, and the y-axis corresponding to the row number, the lower left corner is herein (for simplicity) designated as (1, 1) in RCS and the upper left corner is (640, 240) in RCS.

Further for simplicity, each pixel position in the raster view is associated with a corresponding single memory address location the pixel memory 26, beginning at address A+1 corresponding to the RCS origin (1, 1) and extending to memory position A+153,600 corresponding to the upper right corner (640, 240) in RCS. In this arrangement, pixel data for the bottom row of the raster view is contained in memory locations A+1 through A+640 with the data in each such address corresponding to the respective pixel in the bottom row, column positions 1 through 640, of the raster view 30.

When the user specifies the region 30*a* (FIG. 1B) for initial display, the control table assembler 36 identifies the particular locations within the pixel memory 26 from which the raster data is to be accessed to produce the image in the viewport $V_1$. If the lower left corner of this region 30*a* has RCS coordinates (170, 65) and the lower right corner has coordinates (456, 65), the pixel data for the bottom row of the displayed image in the viewport $V_1$ will be located in the pixel memory 26 at locations A+41,131 through A+41,416. The assembler 36 will specify these addresses for accessing of the pixel data to form the bottom row of the image in the viewport $V_1$.

Panning may be controlled by the operator through the use of a trackball or other input peripheral 46. If panning of the image in the viewport $V_1$ is required, e.g., from the region 30*a* illustrated in FIG. 1B to the region 30*b* of FIG. 3, the operator may rotate the trackball to the left and downward. Such trackball movement is sensed by the viewport image requester 35, which then establishes a lower left corner origin position (advantageously in RCS) for the view position 30*b*. Smooth panning advantageously is carried out using a technique set forth in the inventor's above-identified U.S. Pat. Nos. 4,197,590 and Re. 31,200. The graphics control unit 33 in conjunction with the CPU 45 will establish a series of intermediate image positions, each specified by a lower left corner coordinate value. These are used by the control table assembler 36 to establish the control tables from which corresponding successive images are generated within the viewport $V_1$ of the intermediate regions of the raster view 30 between the initial region 30*a* and the final region 30*b*.

At each such image location, the control table assembler 36 will designate the corresponding memory locations in the pixel memory 26 from which raster data is to be accessed to produce the corresponding intermediately situated images within the viewport $V_1$. When panning has reached the region 30*b* (FIG. 3), in which the lower left corner is at RCS coordinates (40, 10) and the lower right corner is at coordinates (326, 10) the pixel data for the bottom row of the image in the viewport $V_1$ will be obtained from memory locations A+5800 through A+6085.

Toroidal panning occurs if the operator specifies (as by continuing to move the trackball) that the panning should continue further toward the left or downward. Such continued panning would take the displayed image beyond the boundaries of the pictorial data contained within the raster view 30. Provision is made to compensate for this, using the technique of the inventor's U.S. Pat. No. 4,442,495 entitled "Real Time Toroidal Pan". This involves the deletion of a particular strip of data in the raster view 30, in an area away from the direction of travel, and its replacement with a strip of new pictorial data which represents the next portion of the view adjacent to (but not contained within) the original raster view 30, in the direction of panning travel. The result is a new raster view 30-1 illustrated in FIG. 3. Although the concept of such strip replacement is disclosed in the above-identified "Real Time Toroidal Pan" patent application, the manner in which the data for this additional strip is obtained in the present graphics data system is new, and comprises part of the present invention.

Figure 3:
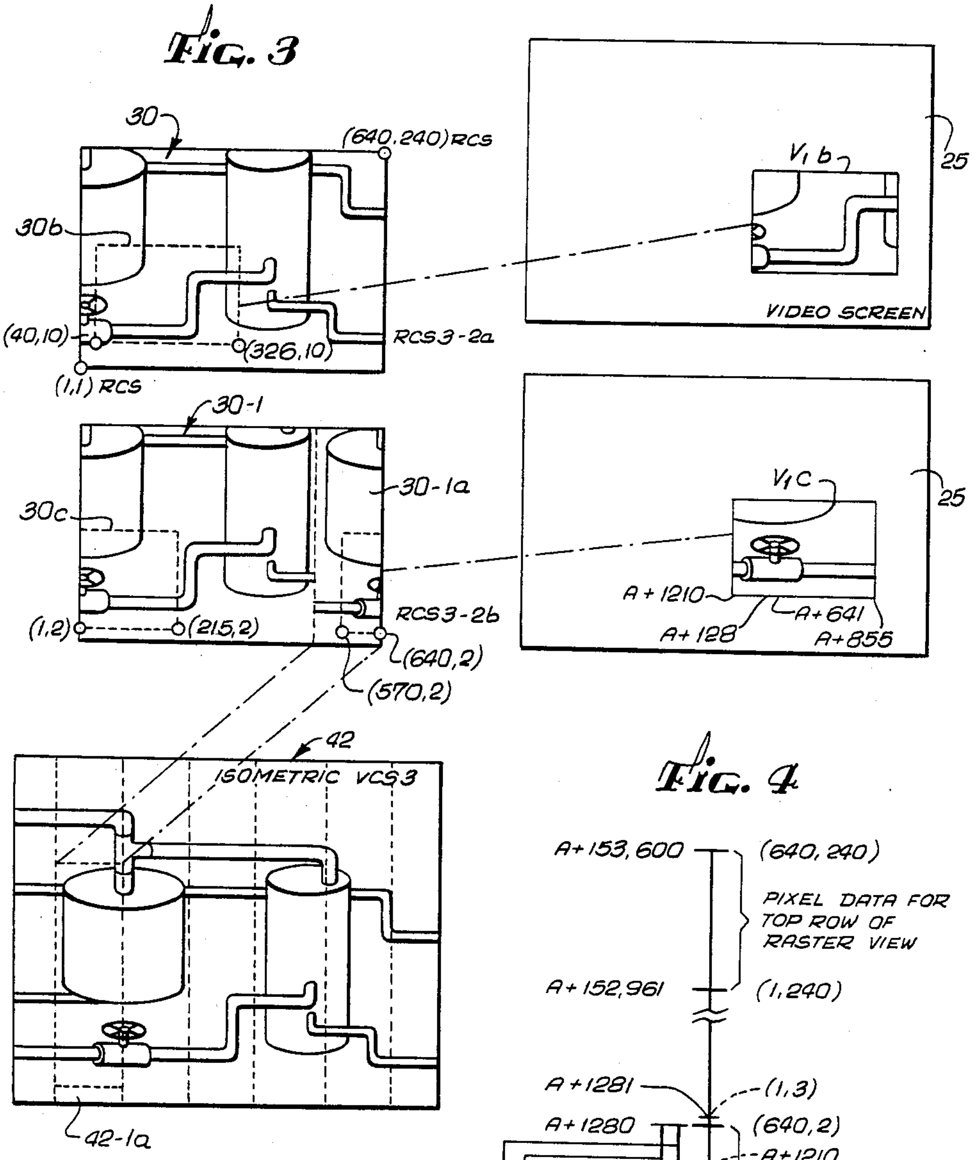
FIG. 3 is a pictorial view illustrating the toroidal entry of data into a raster view, and the toroidal readout of data from that raster view to produce a viewport image, as implemented by the CAD workstation of FIG. 2.

In particular, when the displayed region 30*b* comes within a certain relatively short distance of an edge boundary of the raster view 30, this condition is sensed by the graphics control unit 33, which then initiates the assemblage of the new raster view 30-1. The replacement of data occurs in strips. In the example of FIG. 3, the right hand portion of the raster view 30 has been deleted and replaced by graphics data that is derived by transformation from the backdrop viewfile 42. The new data (in the strip 30-1*a*) correspondes to the region 42-1*a* of the isometric backdrop viewfile 42 immediately to the left of the region that was transformed into the original raster view 30.

Advantageously, the strips that are rewritten into each raster view are of a uniform width. For example, for a raster view that is 640 horizontal pixel locations by 240 lines, vertical strips having a width of say 80 pixels or horizontal strips having a height of say 40 lines may be replaced at one time. With such arrangement, the raster view 30 is converted to the raster view 30-1 by replacing the pixel data in the vertical strip having x-axis coordinates (in RCS) between 561 and 640.

The controller 32 obtains the new pixel information for this replaced strip 30-1*a* by vector to pixel transformation of the graphic data in the desired area 42-1*a* of the backdrop viewfile 42. The transformed data for this new strip 30-1*a* is placed into the pixel memory 26 in the same locations that previously contained the unmodified raster view 30 data for the corresponding RCS strip coordinates. In Other words, the new information for the bottom row of the raster view 30-1 will be stored in pixel memory locations A+561 through A+640, and the pixel data for the next to bottom row of the strip 30-1*a* will be placed into memory locations A+1201 through A+1280.

As panning continues to the left (with respect to the viewport image $V_I$b derived from the region 30*b*), the viewport image requester 35 and the assembler 36 will cooperate to recognize that the bottom left coordinate of the newly desired image has "gone beyond" the left edge of the raster view 30. However, the new strip 30-1*a* of raster information already will have been entered into the pixel memory 26. Thus the assembler 36 will recognize that a portion of the newly desired image $V_I$c representing the region 30*c* in the raster view 30-1 resides at the right side of the raster view 30-1 (when considered in RCS). Accordingly, the assembler 36 will define an appropriate set of control words which specify that certain of the pixel data to create the new image $V_I$c must be obtained from non-contiguous regions of the pixel memory.

For example, to create the bottom line of the viewport image $V_I$c, the pixel data will first be accessed from memory locations A+1210 through A+1280 which contain information relating to the new strip 30-1*a*. This will be followed by information accessed from memory locations A+641 through A+855, which corresponds to the region 30*c* between the RCS coordinates (1, 2) and (215, 2). The resultant image in the viewport $V_I$c will appear just as though the data used to create it had been in contiguous memory locations. The user will be unaware that, in effect, the raster view 30-1 has been "wrapped around" from left to right edge.

Rewriting of horizonal strips into the appropriate raster view similarly will occur when the displayed image is panned downward or upward to the bottom or top border of the raster view 30. Similar "wraparound" accessing of data from the pixel memory will be used to produce the viewport image. The combined left-right wraparound and top-bottom wraparound constitutes a toroidal configuration. Combined with the successive strip transformation and rewriting of the manner described herein, this results in a toroidal panning capability that effectively permits the user to scan across a graphics representation that is considerably larger than is encompassed by a single raster view. Owing to the above described toroidal image generation scheme, the addressing of the pixel memory herein is referred to as being in the "toroidal coordinate system" TCS.

In accordance with the present invention, appropriate backdrop files can be created in advance which cover regions of the plant (represented by the site list in the host computer) that are considerably greater in extent than can be contained with substantial detail in a single raster view. The generation of such backdrop viewfiles may take considerable time, but can be done in advance of usage of the workstation 11 by the designer. Thereafter, as the designer uses his trackball to pan across plant regions encompassed within the backdrop files, the controller 32 can quite quickly perform the necessary vector to raster transformations, and rewrite corresponding new vertical and horizontal strips into the utilized raster views, all in real time. Thus the designer can roam freely over effectively very large scale views of the plant, without the delays which would be needed to perform time consuming direct site list to raster transformations.

I claim:

1. In a video graphics display station, the improvement comprising:

memory means for storing a backdrop viewfile comprising a two dimensional representation in vector format of a selected view of a complex three dimensional structure, toroidal strip writing means for transforming strips of said vector format representation into pixel bit map data format comprising a sequence of raster views representing contiguous regions of said selected view, and panning display means for producing from said raster views a video display which pans across said selected view, said toroidal strip writing means including means for detecting when said display approaches an edge of the region represented by the current raster view and for thereupon causing transformation of a new strip of said vector format representation, said new strip representing the contiguous region of said selected view in the direction of panning but the newly transformed bit map data being entered into the current raster view to replace therein a prior strip representing a portion of said selected view in the direction away from panning travel.

2. A graphics display station according to claim 1 further comprising:

site list storage means for storing a site list describing said complex structure in a three dimensional coordinate system, and transformation means for accessing from said site list, and transforming into said two dimensional vector format for use as said backdrop viewfile, data corresponding to said selected view of said structure.

3. A graphics display station according to claim 2 wherein said transformation means also performs hidden surface removal, so that said backdrop viewfile has hidden surfaces removed.

4. A graphics data handling system for a workstation which operates in conjunction with a host computer that stores a site list describing in a three dimensional coordinate system the components of a structure, said system comprising:

first means for transforming information from said site list into a vector representation of a specified two dimensional view of a defined portion of the structure represented by said site list, file means for storing said vector representation as a "backdrop viewfile", vector-to-raster transformation means for transforming selectable portions of said backdrop viewfile vector representation into a pixel bit map "raster view" representation of at least part of said specified two dimensional view of said structure, pixel memory means for storing said raster view representation, and display means for accessing from said pixel memory means and displaying on a video screen selectable portions of said raster view.

5. A graphics data handling system according to claim 4 further comprising:

panning means, cooperating with said display means, for causing the sequential accessing from said pixel memory means of consecutive, contiguous portions of said raster view, the resultant display on said video screen comprising an image which appears to pan across the part of said structure represented by said raster view, and transformation initiation means, cooperating with said panning means, for recognizing when the displayed image has almost reached an edge of the part of said view represented by the current raster view, and for thereupon causing said transformation means to transform another portion of said backdrop viewfile representing the portion of said two dimensional view of said structure adjacent to that represented by the current raster view in the direction of panning travel into pixel bit map representation, and to replace this new pixel bit map representation into a portion of the current raster view containing part of the view of said structure in the direction away from panning travel.

6. A graphics display station according to claim 4 wherein said transformation means establishes plural raster views from the same backdrop file at different scale factors, display of different raster views thereby facilitating an instant zoom capability.

7. A graphics display station according to claim 4 wherein said first means establishes plural backdrop files from the same site list, each being from a different viewpoint, selected video screen displays from raster views derived from different backdrop files then permitting successive display of a portion of said structure as seen from successively different viewpoints.

8. A graphics data handling system which operates in conjunction with a host computer that stores a site list describing in a three dimensional world coordinate system the components of a complex three dimensional structure, said data handling system comprising:

first data handling means for storing two dimensional backdrop viewfile representation of a certain view of said three dimensional structure, said storage being in a format in which surfaces are defined as vectors or polygons with respect to a two dimensional universal coordinate system, means for accessing data from said backdrop viewfile representation, data representing a selected area of said certain view being definable and accessible with reference to said universal coordinate system, means for transforming data accessed from said backdrop viewfile into a two dimensional bit map raster view representation of said selected area of said certain view, each raster view picture element being represented by a set of data bits associated with a two dimensional raster coordinate system representing the location along horizontal and vertical axes within the raster view of the particular picture element, storage means for storing said data bit sets in a pixel memory and for establishing a directory listing the relationship between each data bit set in the raster coordinate system and the corresponding storage location in said pixel memory, said storage locations being specified in a toroidal coordinate system, and video display means for accessing from said pixel memory, by utilizing said toroidal coordinate system, the bit map data required to present a desired image of said structure, and for displaying accessed bit map in raster format on a video screen.

9. A graphics data handling system in accordance with claim 8 further comprising:

panning control means for requesting that the displayed video screen image pan across the area of said certain view encompassed by said raster view representaton, said video display means accessing from said pixel memory consecutive different sets of pixel bit map data respectively corresponding to consecutive near adjacent regions of said area, the resultant displayed video screen image providing a pan effect, means for detecting when, in the raster coordinate system, the displayed image has approached an edge of the selected area represented by the current raster view, and for thereupon causing said means for transforming to delete from said raster view representation a strip of data in a direction away from the direction of panning travel, and to initiate accessing and vector-to-raster transformation of additional data for replacement into said strip, a corresponding entry being made in said directory list indicating in the toroidal coordinate system the storage locations of data bit sets in the replaced strip, said video display means thereafter accessing bit map data for subsequent consecutive images from a combination of the unreplaced and replaced portions of the raster view, by reference to the corresponding pixel memory addresses in the toroidal coordinate system.

* * * * *